(12) United States Patent
Koyano et al.

(10) Patent No.: US 8,565,604 B2
(45) Date of Patent: Oct. 22, 2013

(54) APPARATUS AND METHOD FOR ADJUSTING OPTICAL SIGNALS

(75) Inventors: Hideaki Koyano, Kawasaki (JP); Kazukiyo Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 988 days.

(21) Appl. No.: 12/318,320

(22) Filed: Dec. 24, 2008

(65) Prior Publication Data

US 2009/0290870 A1    Nov. 26, 2009

(30) Foreign Application Priority Data

May 22, 2008    (JP) ................................. 2008-134030

(51) Int. Cl.
*H04B 10/00* (2013.01)
*H04J 14/00* (2006.01)

(52) U.S. Cl.
USPC ............................................. 398/94; 398/34

(58) Field of Classification Search
USPC ....................................................... 398/94, 34
See application file for complete search history.

(56) References Cited

U.S. PATENT DOCUMENTS

| | | | |
|---|---|---|---|
| 6,031,647 A * | 2/2000 | Roberts | 398/94 |
| 7,209,661 B2 | 4/2007 | Mori et al. | |
| 2002/0163690 A1 * | 11/2002 | Yang | 359/124 |
| 2003/0099375 A1 | 5/2003 | Sefcik | |
| 2003/0099475 A1 | 5/2003 | Nemoto | |
| 2010/0239263 A1 * | 9/2010 | Tokura et al. | 398/94 |

FOREIGN PATENT DOCUMENTS

| | | | |
|---|---|---|---|
| JP | 2003-163641 | | 6/2003 |
| JP | 2003-348018 | | 12/2003 |
| JP | 2004-140631 | | 5/2004 |
| WO | WO/2007/138649 | * | 6/2007 |

OTHER PUBLICATIONS

Japanese Office Action mailed Apr. 10, 2012 issued in corresponding Japanese Patent Application No. 2008-134030.

* cited by examiner

*Primary Examiner* — Nathan Curs
(74) *Attorney, Agent, or Firm* — Staas & Halsey LLP

(57) ABSTRACT

An optical signal adjustment apparatus detects an optical signal intensity level of signal light components with multiple different wavelengths for each of the wavelengths in an optical detection unit and adjusts the signal light components with the wavelengths for each of the wavelengths in a variable optical attenuator to make the optical signal intensity levels of the signal light components uniform. The apparatus includes a control unit configured to successively select a detection signal associated with each of the wavelengths from the optical detection unit and generate a control signal for the wavelength based on the selected detection signal. The control signal generated by the control unit is supplied to the variable optical attenuator associated with the selected detection signal.

9 Claims, 14 Drawing Sheets

FIG.13

| | PROCESS-ING ORDER | WAVE-LENGTH NUMBERS λn | CORRECTED INPUT OPTICAL POWER (CURRENT VALUE) Pi ⟨dBm⟩ | INPUT OPTICAL POWER (PREVIOUS VALUE) Pb ⟨dBm⟩ | CONTROLLED POWER LEVEL (CONTROL VALUE) Pc ⟨dBm⟩ | VARIATIONS OF INPUT OPTICAL POWER (\|Pi−Pd\|) Pd ⟨dB⟩ | NEXT PROCESS-ING ORDER (ADDRESS) M | NOTE |
|---|---|---|---|---|---|---|---|---|
| INITIAL-IZATION | 1 | λ1 | 0.0 | | −1.0 | | | VOA CONTROL TO BE CENTER VALUE OF SPECIFIED THRESHOLDS |
| | 2 | λ2 | +0.5 | | −1.0 | | | |
| | 3 | λ3 | −1.0 | | −1.0 | | | |
| | 4 | λ4 | −2.0 | | −1.0 | | | |
| FIRST TIME | 1 | λ1 | −1.0 | (−1.0) | −1.0 | (0.0) | 4 | LIST IN ORDER CLOSER TO SPECIFIED THRESHOLDS (UPPER BOUND/LOWER BOUND) |
| | 2 | λ2 | −1.2 | (−1.0) | −1.2 | (0.2) | 3 | |
| | 3 | λ3 | −1.5 | (−1.0) | −1.5 | (0.5) | 2 | |
| | 4 | λ4 | −1.8 | (−1.0) | −1.8 | (0.8) | 1 | |
| SECOND TIME | 1 | λ1 | −1.8 | −1.8 | −1.8 | 0.0 | 4 | LIST IN DESCENDING ORDER OF VARIATIONS |
| | 2 | λ2 | −1.0 | −1.5 | −1.0 | 0.5 | 1 | |
| | 3 | λ3 | −1.5 | −1.2 | −1.5 | 0.3 | 2 | |
| | 4 | λ4 | −0.8 | −1.0 | −0.8 | 0.2 | 3 | |
| THIRD TIME | 1 | λ1 | −2.1 | −1.0 | −1.0 | 1.1 | 1 | λ3: WITH CONTROL TO CENTER VALUE OPERATION PRIORITY  WITH CONTROL TO WITHOUT (DESCENDING CENTER VALUE > ORDER OF VARIATIONS) (PRIORITY: HIGH) (PRIORITY: LOW) |
| | 2 | λ2 | −1.5 | −1.5 | −1.5 | 0.0 | 4 | |
| | 3 | λ3 | −1.0 | −0.8 | −1.0 | 0.2 | 3 | |
| | 4 | λ4 | −1.3 | −1.8 | −1.3 | 0.5 | 2 | |
| FOURTH TIME | 1 | λ1 | | | | | | OPERATIONS REPEATED SUBSEQUENTLY |
| | 2 | λ2 | | | | | | |
| | 3 | λ3 | | | | | | |
| | 4 | λ4 | | | | | | |

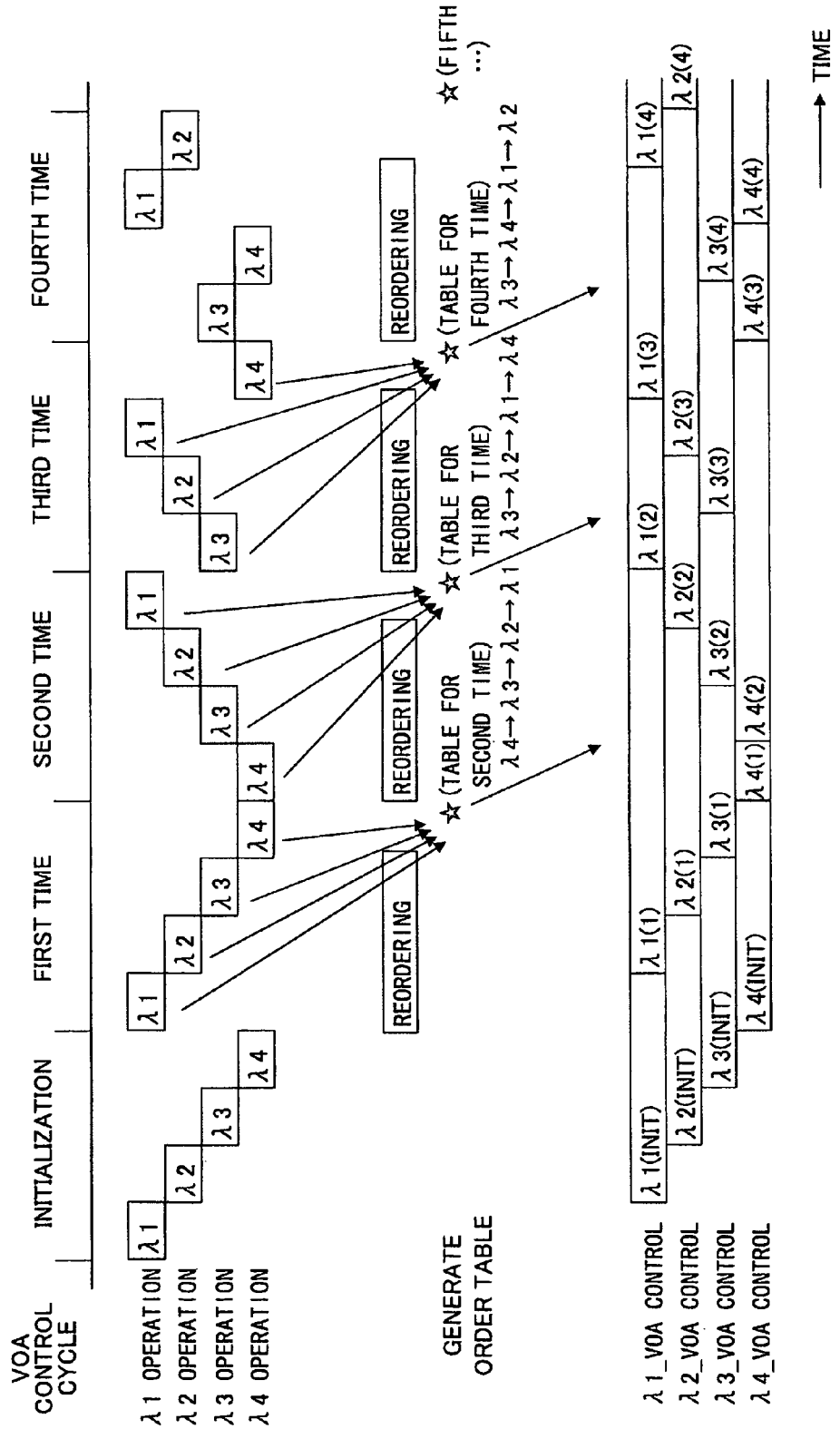

APPARATUS AND METHOD FOR ADJUSTING OPTICAL SIGNALS

CROSS-REFERENCE TO RELATED APPLICATIONS

This application is based upon and claims the benefit of priority of the prior Japanese Patent Application No. 2008-134030, filed on May 22, 2008, the entire contents of which are incorporated herein by reference.

BACKGROUND OF THE INVENTION

1. Field of the Invention

Embodiments discussed herein are directed to an apparatus and method for adjusting optical signals by adjusting signal light components with multiple wavelengths for each of the wavelengths.

2. Description of the Related Art

In WDM (Wavelength Division Multiplexer) transmission systems, when the number of optical wavelengths (accommodating ports) or span loss in transmission channels varies in an OADM (Optical Add-Drop Multiplexer), an optical amplifier or others, a VOA (Variable Optical Attenuator) is used in an optical signal level adjustment unit to keep a constant intensity (power) of an optical signal in order to maintain a certain communication quality.

FIG. 1 is a block diagram illustrating an exemplary conventional WDM transmission apparatus. In this illustration, an optical signal transmitted in an optical channel and multiplexed with wavelengths λ1 through λN is amplified in an optical amplifier 11 and then is wavelength-demultiplexed in a wavelength demultiplexer (DMUX) 12. After optical signals with different wavelengths are switched in an optical switch (OSW) 13, the optical signals are adjusted in respective optical signal level adjustment units 14-1 through 14-N to make the respective intensity (power) levels of the optical signals uniform. Then, the adjusted optical signals are wavelength-multiplexed in a wavelength multiplexer (MUX) 15, amplified in a transmission amplifier 16 and then supplied to an optical channel.

FIG. 2 is a block diagram illustrating an exemplary conventional optical signal level adjustment unit. In this illustration, an optical signal level adjustment unit includes a monitor (PD) unit 14a for detecting the intensity of an optical signal, a control (CNT) unit 14b for generating a control signal corresponding to the detected intensity of an optical signal and an adjustment (VOA) unit 14c.

Japanese Laid-open Patent Publication No. 2004-140631 proposes that VOAs associated with respective multiple different wavelengths are controlled depending on output levels of the VOAs and analyzed levels of the respective wavelengths by monitoring wavelength-multiplexed light components of outputs of the VOAs associated with multiple different wavelengths.

Recent explosive growth of optical communications traffic has promoted larger-scale WDM transmission systems and demanded more compact circuits for adjusting power of optical signals.

In such a larger-scale WDM transmission system, however, the control unit 14b for level adjustment of optical signals must include a number of correction units 14b1 and VOA control unit circuits 14b2 corresponding to the number of wavelengths, resulting in a larger-scale circuit.

SUMMARY OF THE INVENTION

Accordingly, it is an object of the present invention to reduce the size of optical signal power adjustment circuits as stated above.

One aspect of the invention relates to an optical signal adjustment apparatus for detecting an optical signal intensity level of signal light components with multiple different wavelengths for each of the wavelengths in an optical detection unit and adjusting the signal light components with the wavelengths for each of the wavelengths in a variable optical attenuator to make the optical signal intensity levels of the signal light components uniform, the apparatus including a control unit configured to successively select a detection signal associated with each of the wavelengths from the optical detection unit and generate a control signal for the wavelength based on the selected detection signal, wherein the control signal generated by the control unit is supplied to a variable optical attenuator associated with the selected detection signal.

Preferably, the control unit may include an order table indicative of a selection order in which the detection signals associated with the different wavelengths from the optical detection unit are selected.

Another aspect of the present invention relates to an optical signal adjustment method for detecting an optical signal intensity level of signal light components with multiple different wavelengths for each of the wavelengths in an optical detection unit and adjusting the signal light components with the wavelengths for each of the wavelengths in a variable optical attenuator to make the optical signal intensity levels of the signal light components uniform, the method including successively selecting a detection signal associated with each of the wavelengths from the optical detection unit and generating a control signal for the wavelength based on the selected detection signal, and supplying the generated control signal to a variable optical attenuator associated with the selected detection signal.

Preferably, an order table may be indicative of a selection order in which the detection signals associated with the different wavelengths from the optical detection unit are selected.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 13 illustrates exemplary various data in a VOA control operation; and

FIG. 14 illustrates an exemplary timing chart in a VOA control operation.

DETAILED DESCRIPTION OF THE PREFERRED EMBODIMENTS

Embodiments of the present invention are described with reference to the accompanying drawings.

[Configuration of WDM Transmission Apparatus]

Figure 1:
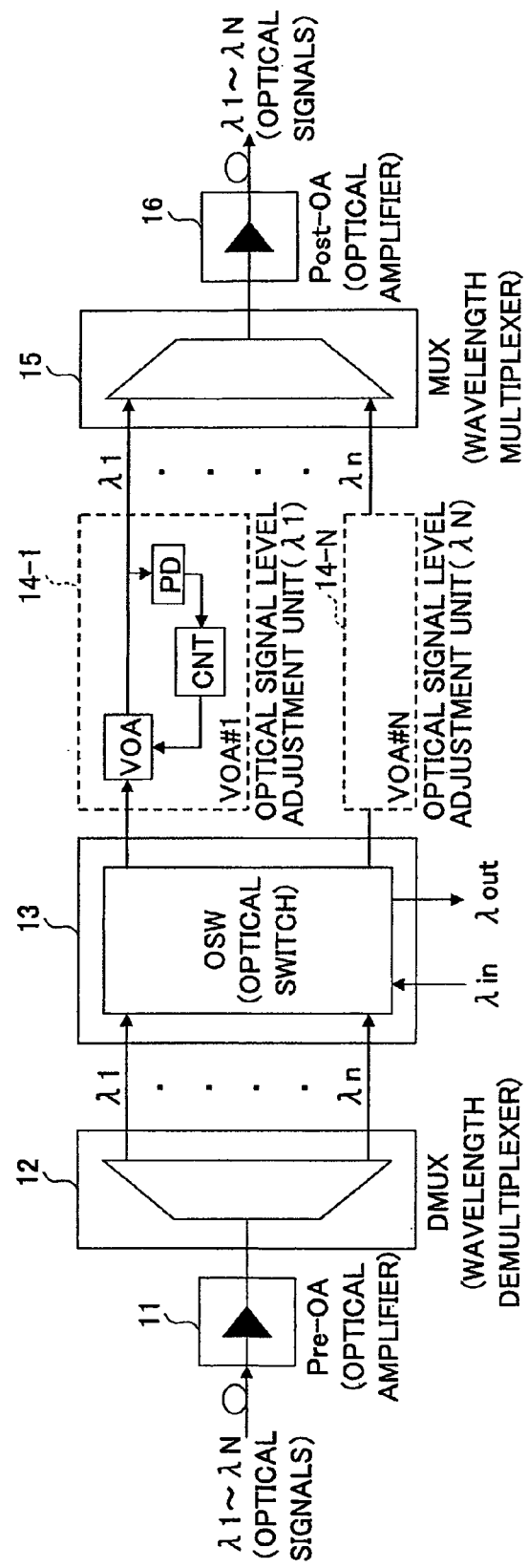
FIG. 1 is a block diagram illustrating an exemplary conventional WDM transmission apparatus.
Figure 2:
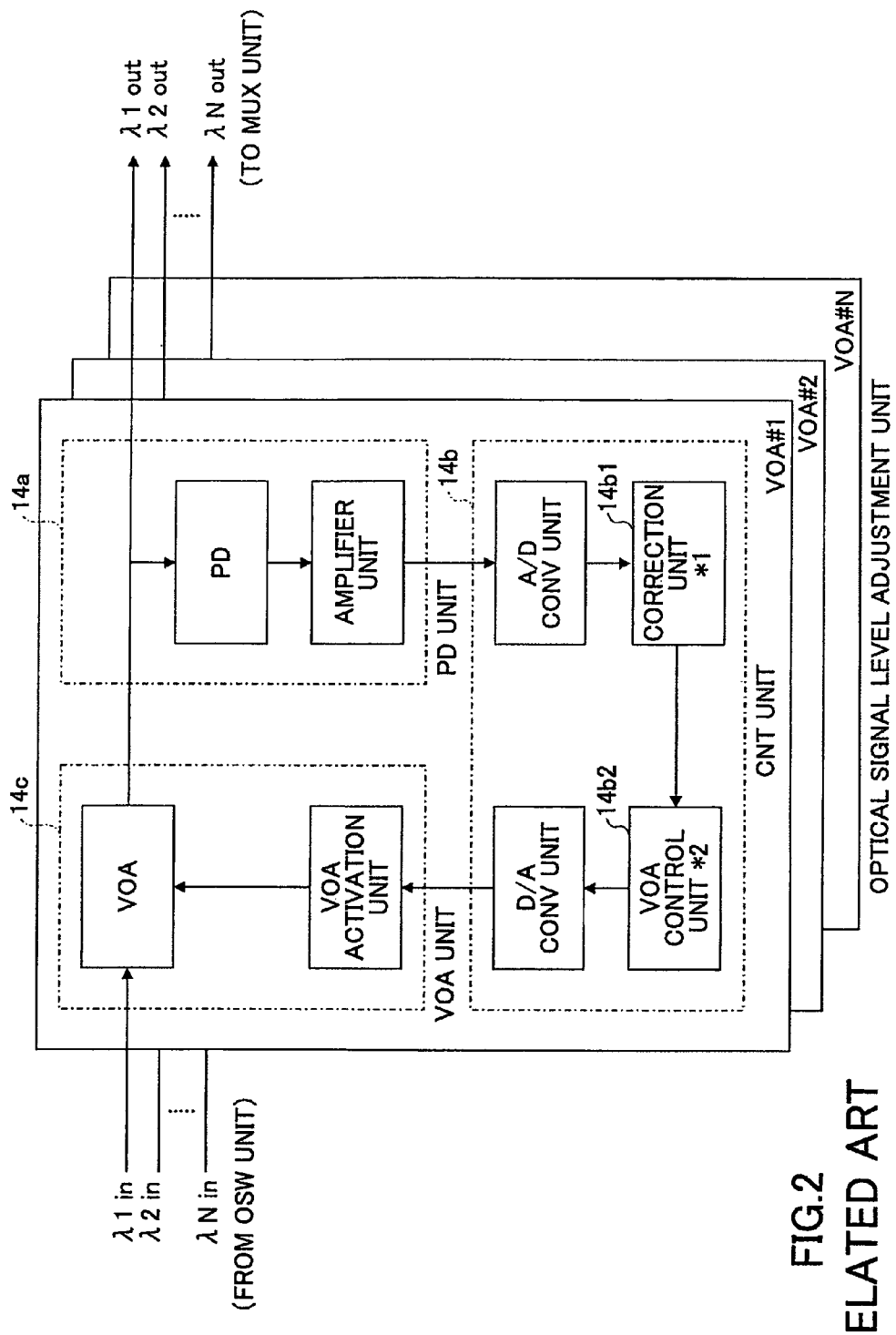
FIG. 2 is a block diagram illustrating an exemplary conventional optical signal level adjustment unit.
Figure 3:
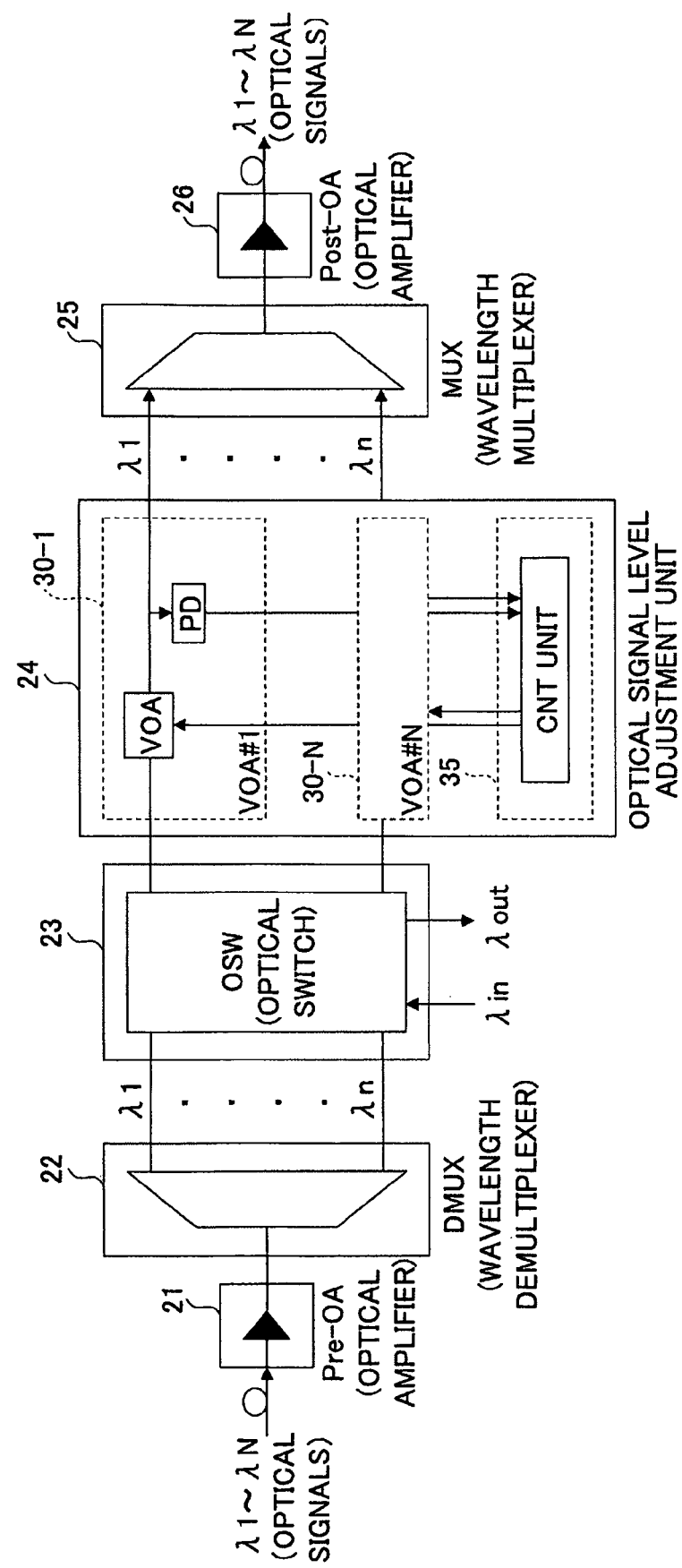
FIG. 3 is a block diagram illustrating a WDM transmission apparatus according to one embodiment of the present invention.

FIG. 3 is a block diagram illustrating a WDM transmission apparatus according to one embodiment of the present invention. In this illustration, an optical signal transmitted in an optical channel and multiplexed with wavelengths $\lambda 1$ through $\lambda N$ is amplified in an optical amplifier 21 and then is wavelength-demultiplexed in a wavelength demultiplexer 22. After the demultiplexed optical signals with different wavelengths are switched in an optical switch 23, the optical signals are adjusted in an optical signal level adjustment unit 24 to make the respective intensity (power) levels of the optical signals uniform. The adjusted optical signals are wavelength-multiplexed in a wavelength multiplexer (MUX) 25, amplified in a transmission amplifier 26 and then supplied to an optical channel.

The optical signal level adjustment unit 24 may include monitoring and adjustment units 30-1 through 30-N associated with respective wavelengths and a common control unit 35.

Figure 4:
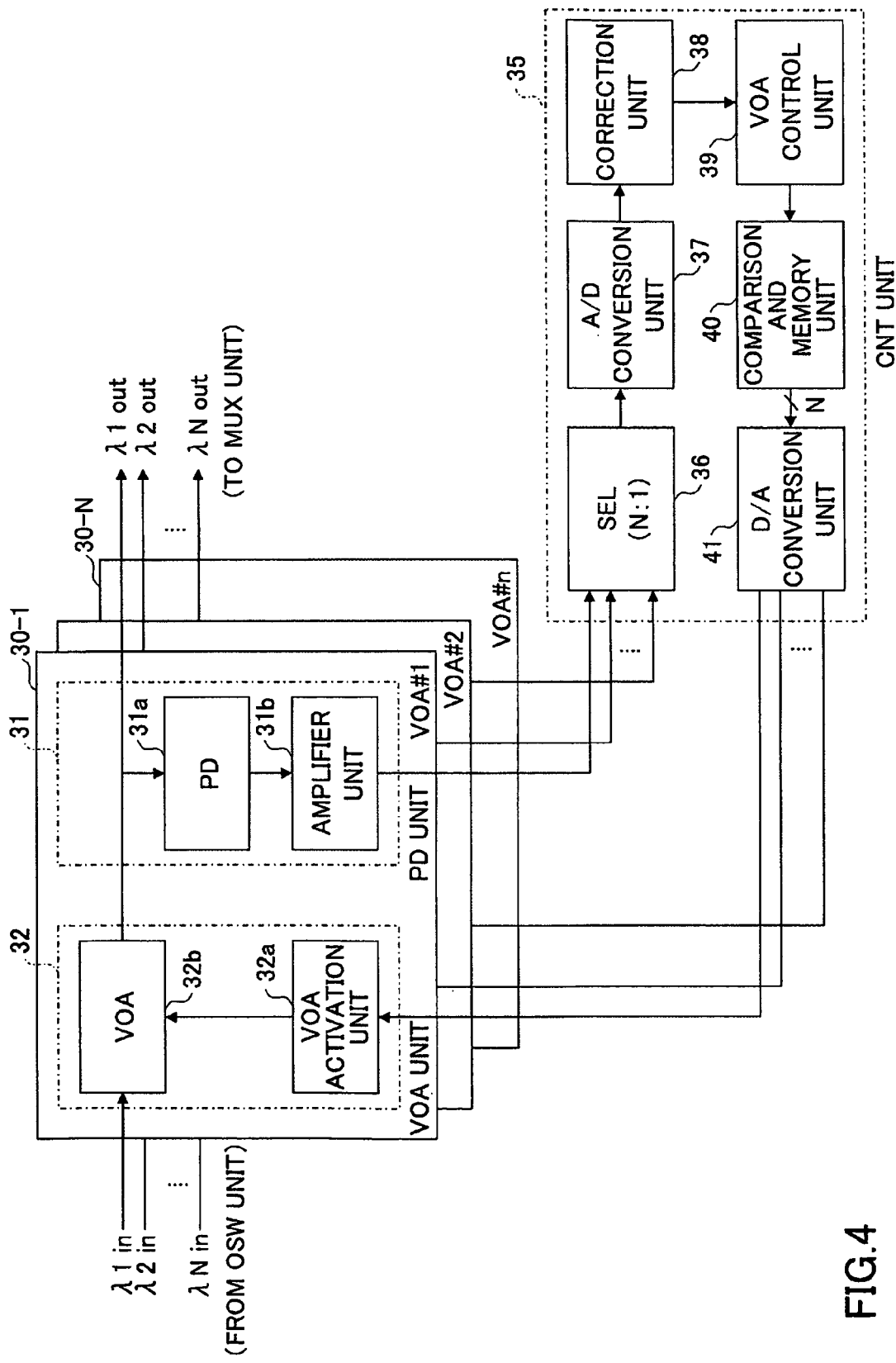
FIG. 4 is a block diagram illustrating an optical signal level adjustment unit according to one embodiment of the present invention.

FIG. 4 is a block diagram illustrating the optical signal level adjustment unit 24 according to one embodiment of the present invention. In this illustration, each of the monitoring and adjustment units 30-1 through 30-N may include a monitoring unit 31 and an adjustment unit 32. The monitoring unit 31 may include a photo diode (PD) 31*a* for detecting the intensity of an optical signal and an amplifier unit 31*b* for amplifying an output of the photo diode 31*a* and supplying the amplified output to the control unit 35. The adjustment unit 32 may include a VOA activation unit 32*a* for activating a VOA 32*b* depending on a control signal supplied from the control unit 35 and the VOA (Variable Optical Attenuator) 32*b* for adjusting attenuation for an incoming optical signal.

The control unit 35 may include a selection unit (SEL) 36 for selecting and outputting one of optical intensity detection signals supplied from the respective monitoring units 31 in the monitoring and adjustment units 30-1 through 30-N, an A/D conversion unit 37 for analog to digital converting an output signal of the selection unit 36, a correction unit 38 for correcting nonuniformity of the characteristics of the individual photo diodes 31*a*, a VOA control unit 39 for generating a VOA control value depending on a corrected optical intensity detection value, a comparison and memory unit 40 for comparing and storing the VOA control value supplied from the VOA control unit 39 with one or more thresholds, and a D/A conversion unit 41 for digital to analog converting VOA control values for different wavelengths supplied from the comparison and memory unit 40 and supplying the converted VOA control values to the associated respective adjustment units 32.

Figure 5:
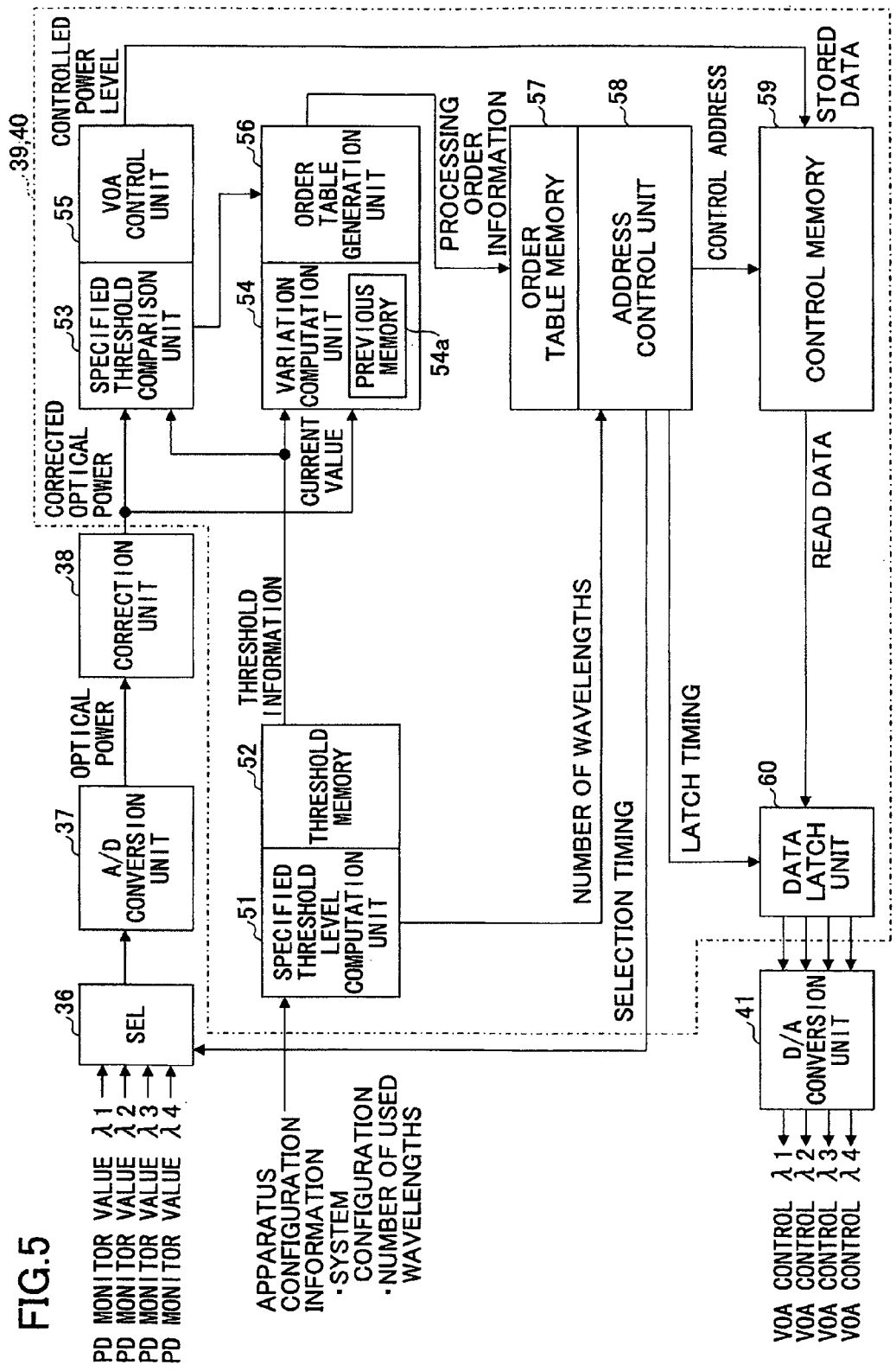
FIG. 5 is a functional block diagram illustrating a VOA control unit and a comparison and memory unit according to one embodiment of the present invention.

FIG. 5 is a functional block diagram illustrating the VOA control unit 39 and the comparison and memory unit 40 according to one embodiment of the present invention. In this illustration, the same parts as those in FIG. 4 are designated by the same reference numerals.

In FIG. 5, a specified threshold level computation unit 51 within the VOA control unit 39 and the comparison and memory unit 40 receives and stores apparatus configuration information, that is, system configuration and the number of used wavelengths, from an upper external apparatus (not illustrated). The specified threshold level computation unit 51 computes some threshold levels (an upper bound threshold, a lower bound threshold and a center value (target control value) between the upper bound threshold and the lower bound threshold) and stores the computed threshold levels in a threshold memory 52. These thresholds are read from the threshold memory 52 and supplied to a specified threshold comparison unit 53 and a variation computation unit 54.

The specified threshold comparison unit 53 computes a difference between a corrected optical intensity detection value supplied from the correction unit 38 and a closer one of the upper bound threshold and the lower bound threshold and supplies the difference to an order table generation unit 56. In addition, the specified threshold computation unit 53 computes a difference (deviation) between the corrected optical intensity detection value and the center value (target control value) and supplies the difference along with the corrected optical intensity detection value to the VOA control unit 55. The VOA control unit 55 generates a VOA control value depending on the corrected optical intensity detection value and the center value. This VOA control value is stored in a control memory 59.

The variation computation unit 54 computes a variation or difference between the corrected optical intensity detection value supplied from the correction unit 38 and the previously corrected optical intensity detection value associated with the relevant wavelength stored in a previous memory 54*a* and supplies the variation to the order table generation unit 56. Then, the currently corrected optical intensity detection value is stored in the previous memory 54*a* instead of the previously corrected optical intensity detection value associated with the relevant wavelength.

The order table generation unit 56 arranges wavelength numbers in an order table stored in an order table memory 57 in descending order of the difference or the variation based on the difference between the optical intensity detection value supplied from the specified threshold comparison unit 53 and a closer one of the upper bound threshold and the lower bound threshold or the variation supplied from the variation computation unit 54.

An address control unit 58 receives the number of wavelengths from the specified threshold level computation unit 51. The address control unit 58 generates control addresses corresponding to the wavelength numbers successively read from the order table and reads the control memory 59 by accessing the control addresses. VOA control values read from the control memory 59 are latched in a data latch unit 60 for the supplied wavelength numbers. Also, the address control unit 58 specifies a selection timing of the wavelength selection unit 36 and a latch timing of the data latch unit 60.

The data latch unit 60 supplies the VOA control values latched for the respective wavelengths to the D/A conversion unit 41.

[Operations of WDM Transmission Apparatus]

Figure 6:
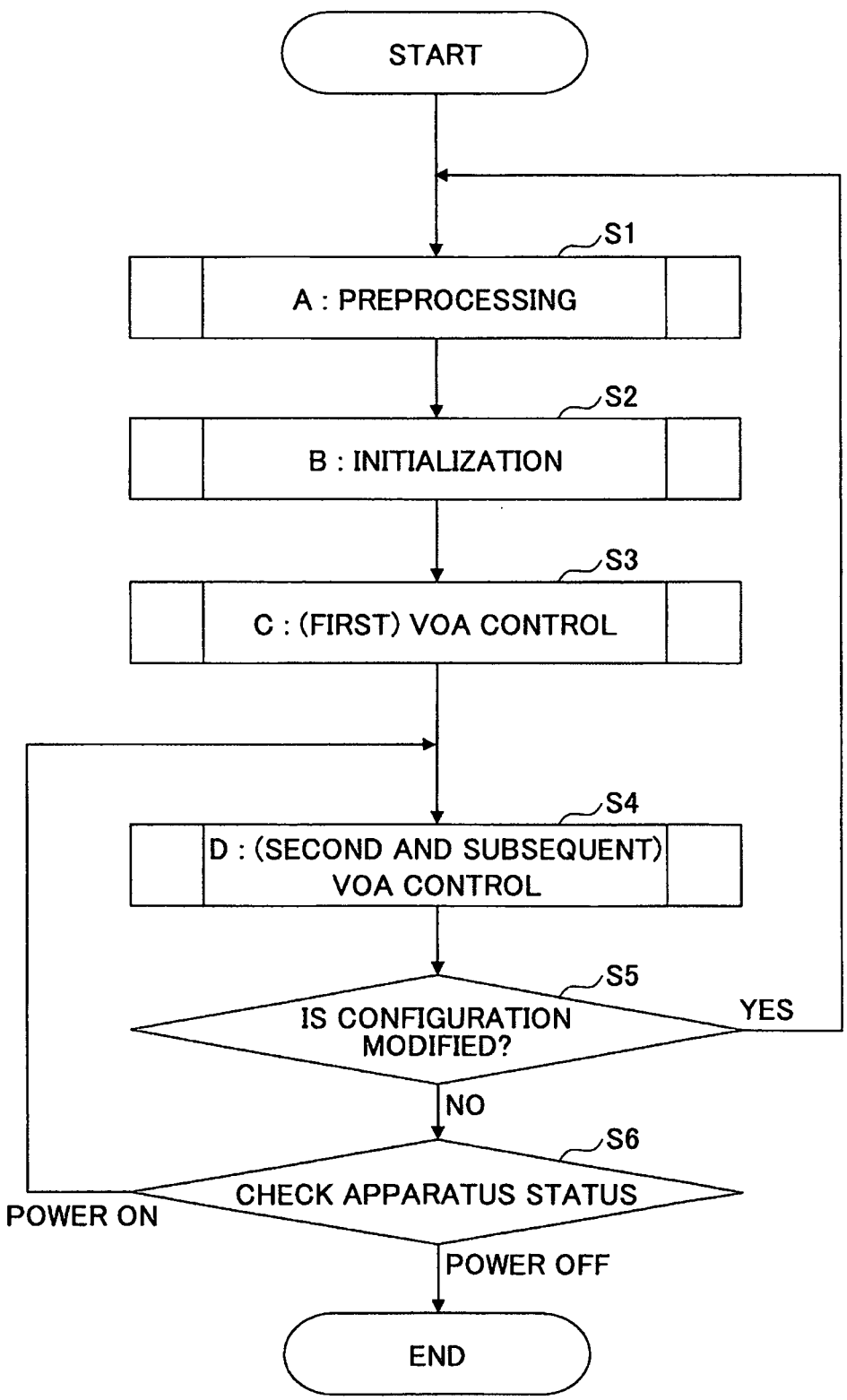
FIG. 6 is a flowchart of a VOA control operation according to one embodiment of the present invention.

FIG. 6 is a flowchart of a VOA control operation according to one embodiment of the present invention. This operation is performed by the VOA control unit 39 and the comparison and memory unit 40.

In this illustration, upon powering on the WDM transmission apparatus, some thresholds (upper bound threshold and lower bound threshold) for VOA control are specified at step S1 based on the system configuration and the number of used wavelengths in the apparatus configuration information. Next, in initialization (step S2), a VOA control value is computed for each wavelength to make a monitored optical intensity detection value equal to the center value between the upper bound threshold and the lower bound threshold.

At step S3, the first VOA control operation is performed to generate a VOA control order table. Next at step S4, the second and subsequent VOA control operations are performed to generate or update the VOA control order table.

At step S5, it is determined whether the configuration has been modified, and if the configuration has been modified, the process control returns to step S1. On the other hand, if the configuration has not been modified, the current status of the WDM transmission apparatus is determined at step S6. If the WDM transmission apparatus is powered on, the process control returns to step S4 for iteration of the above-mentioned operations.

Figure 7:
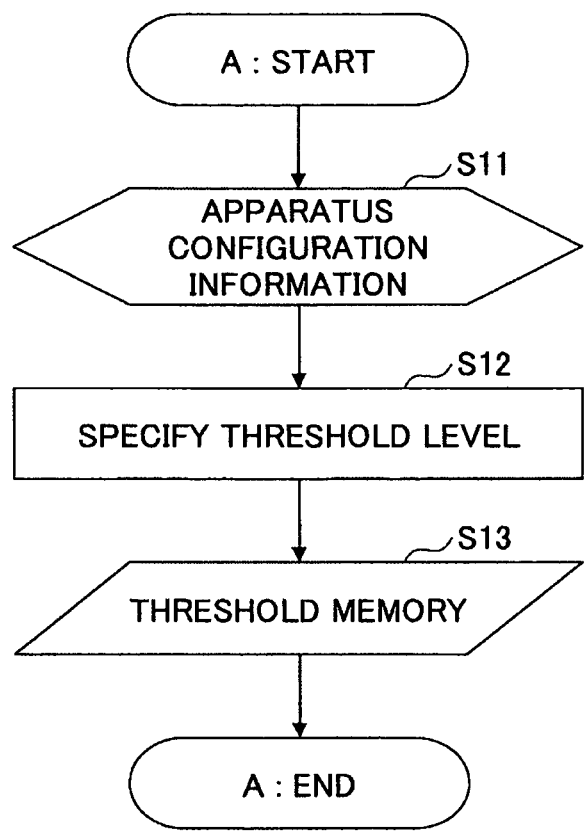
FIG. 7 is a detailed flowchart of a preprocessing operation according to one embodiment of the present invention.

FIG. 7 is a detailed flowchart of a preprocessing operation at step S1 according to one embodiment of the present invention. In this illustration, the apparatus configuration information, that is, the system configuration and the number (N) of used wavelengths, from the apparatus control unit is referred to at step S11. Next at step S12, thresholds (the upper bound threshold and the lower bound threshold) for VOA control are specified based on the apparatus configuration information. At step S13, the upper bound threshold and the lower bound threshold along with the center value between the upper bound threshold and the lower bound threshold are stored in the threshold memory 52.

Figure 8:
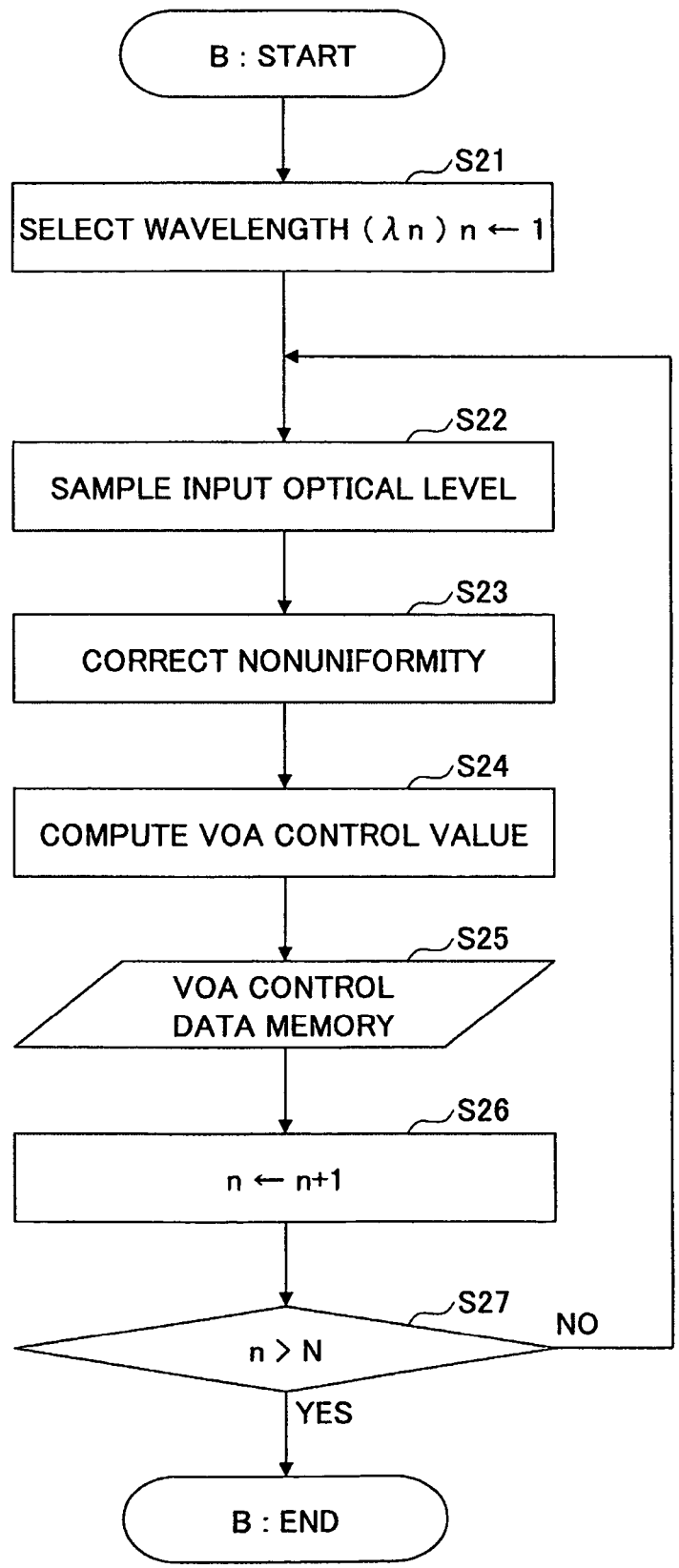
FIG. 8 is a detailed flowchart of an initialization operation according to one embodiment of the present invention.

FIG. 8 is a detailed flowchart of an initialization operation at step S2 according to one embodiment of the present invention. In this illustration, an input wavelength (λn) is selected at step S21 as the wavelength number n=1. At step S22, the optical signal intensity P(λn) [dBm] being equal to an input level of the selected wavelength (λn) is sampled.

At step S23, nonuniformity of a photo diode 31a associated with the selected wavelength is corrected. Note that some characteristic data for correction of the nonuniformity of the individual photo diodes 31a is stored in the correction unit 38 in advance.

At step S24, a VOA control value is computed such that the corrected optical signal intensity can be equal to the center value between the specified thresholds. At step S25, the VOA control value is stored in the control memory 59. The VOA control value is read for each wavelength from the control memory 59 in a predefined cycle and latched in the data latch unit 60 for VOA control.

Then, the parameter n is incremented by one at step S26, and the process control returns to step S22 for iteration of the above-mentioned operation as long as the parameter n is smaller than or equal to the number N of used wavelengths.

Figure 9:
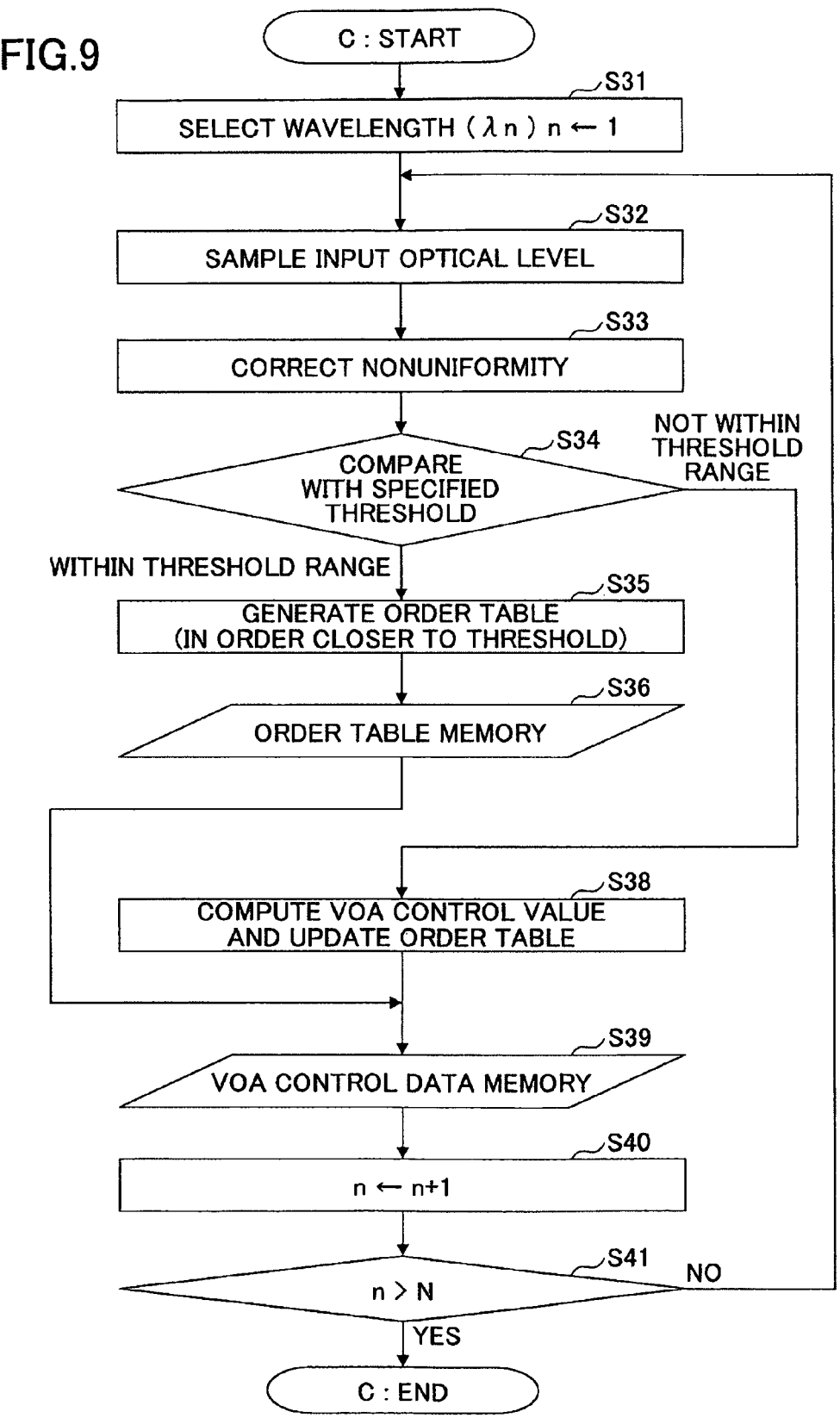
FIG. 9 is a detailed flowchart of a first VOA control operation according to one embodiment of the present invention.

FIG. 9 is a detailed flowchart of the first VOA control operation performed at step S3 according to one embodiment of the present invention. In this illustration, an input wavelength (λn) is selected as the wavelength number n=1 at step S31. At step S32, the optical signal intensity P(λn) dBm indicative of an input level of the selected wavelength (λn) is sampled. At step S33, nonuniformity of a photo diode 31a associated with the selected wavelength is corrected.

At step S34, the corrected optical signal intensity is compared with the upper bound threshold and the lower bound threshold to determine whether the corrected optical signal intensity ranges from the upper bound threshold to the lower bound threshold. If the corrected optical signal intensity is between the upper bound threshold and the lower bound threshold, the process control proceeds to step S35 to update control order without modification of the VOA control value. On the other hand, if the corrected optical signal intensity is not between the upper bound threshold and the lower bound threshold, the process control proceeds to step S38 to modify the VOA control value.

At step S35, an order table is generated such that entries of the corrected optical signal intensity are listed in order closer to the upper bound threshold or the lower bound threshold, that is, in descending order of deviation from the center value. At step S36, the order table is stored in an order table memory 57, and then the process control proceeds to step S39.

On the other hand, at step S38, the VOA control value is determined to make the corrected optical signal intensity equal to the center value between the specified thresholds. In addition, the wavelength number n associated with the determined VOA control value is listed at the top of the order table, and the updated order table is stored in the order table memory 57.

At step S39, the VOA control value is read from the control memory 59 for each wavelength in a predefined cycle (through interrupt or others) and latched in a data latch unit 60 for VOA control.

Then, at step S40, the parameter n is incremented by one, and the process control returns to step S32 for iteration of the above-mentioned operations as long as the parameter n is smaller than or equal to the number N of used wavelengths.

Figure 10:
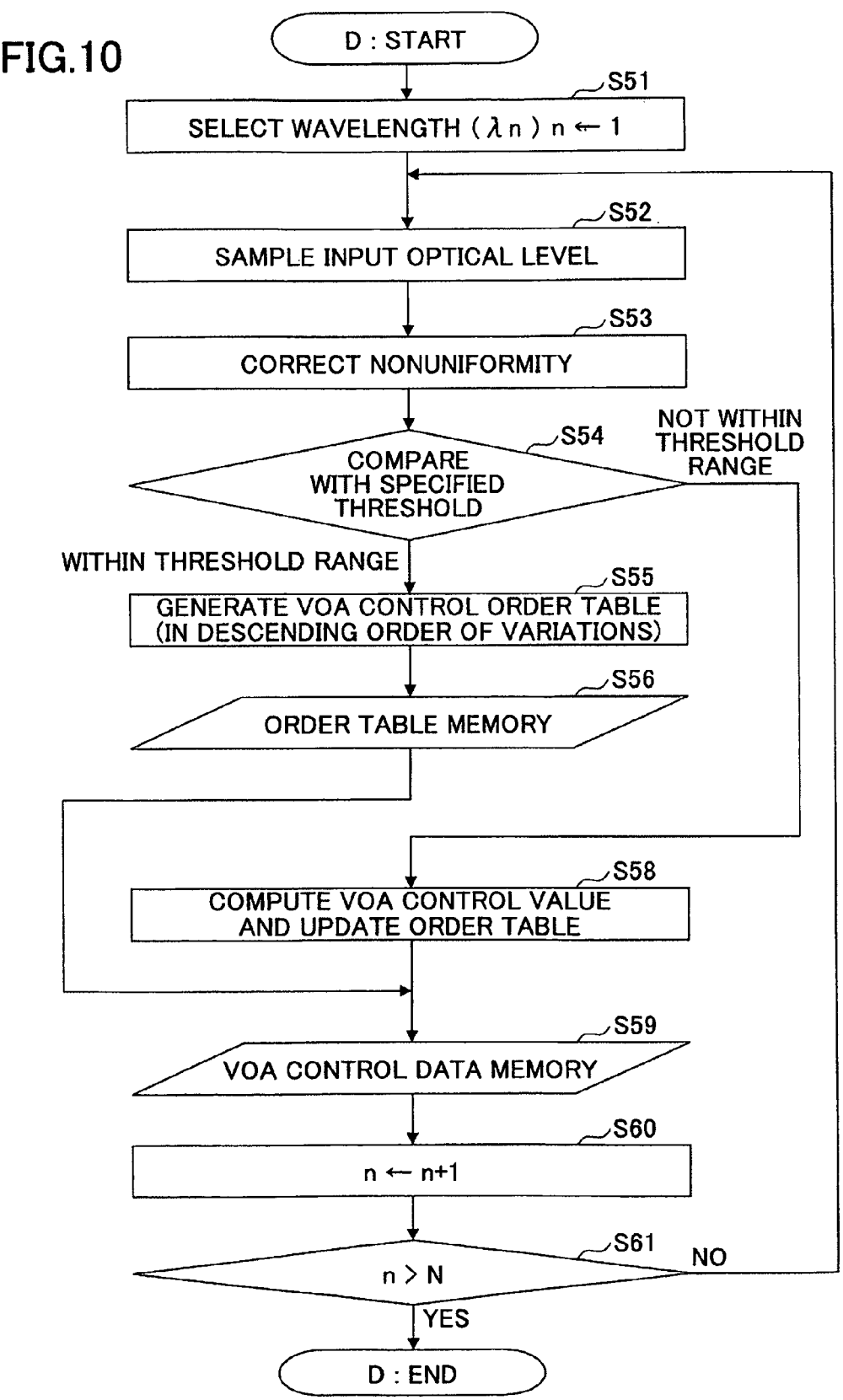
FIG. 10 is a detailed flowchart of a second or subsequent VOA control operation according to one embodiment of the present invention.

FIG. 10 is a detailed flowchart of the second and subsequent VOA control operation performed at step S4 according to a first embodiment of the present invention. In this illustration, an input wavelength (λn) is selected as the wavelength number n=1. At step S52, the optical signal intensity P(λn) dBm indicative of an input level of the selected wavelength (λn) is sampled. At step S53, nonuniformity of a photo diode 31a associated with the selected wavelength is corrected.

At step S54, the corrected optical signal intensity is compared with the upper bound threshold and the lower bound threshold to determine whether the corrected optical signal intensity ranges from the upper bound threshold to the lower bound threshold. If the corrected optical signal intensity is between the upper bound threshold and the lower bound threshold, the process control proceeds to step S55 to update the control order without modification of the VOA control value. On the other hand, if the corrected optical signal intensity is not between the upper bound threshold and the lower bound threshold, the process control proceeds to step S58 to modify the VOA control value.

At step S55, an order table is generated such that entries are listed in descending order of variations between currently or last corrected optical intensity detection values and previously corrected optical intensity detection values. At step S56, the order table is stored in the order table memory 57, and then the process control proceeds to step S59.

On the other hand, at step S58, a VOA control value is computed to make the corrected optical signal intensity equal to the center value between specified thresholds. Also, the wavelength number n associated with the computed VOA control value is listed as the first entry at the top of the order table, and then the updated order table is stored in the order table memory 57.

At step S59, the VOA control value is read from the control memory 59 for each wavelength in a predefined cycle (through interrupt or others) and latched in the data latch unit 60 for VOA control.

Then, at step S60, the parameter n is incremented by one, and the process control returns to step S52 for iteration of the above-mentioned operations as long as the parameter n is smaller than or equal to the number N of used wavelengths.

Figure 11:
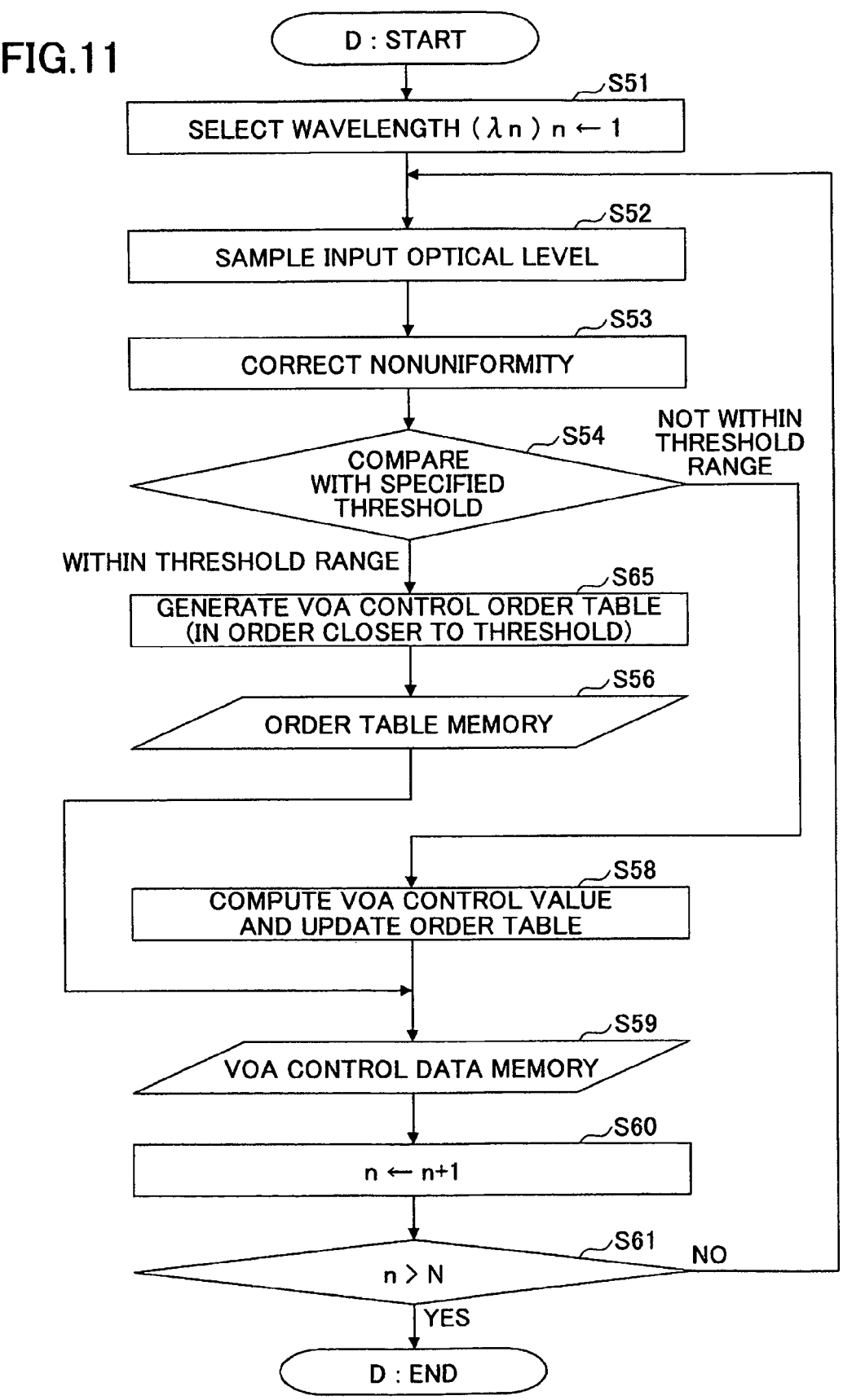
FIG. 11 is a detailed flowchart of a second or subsequent VOA control operation according to another embodiment of the present invention.

FIG. 11 is a detailed flowchart of the second and subsequent VOA control operations performed at step S4 according to a second embodiment of the present invention. In this illustration, the same parts are designated as the same reference numerals. In this embodiment, like the first VOA control operation (FIG. 9), an order table is generated such that entries of the corrected optical signal intensity are listed in order closer to the upper bound threshold or the lower bound threshold, that is, in descending order of deviations from the center value.

In FIG. 11, at step S51, an input wavelength ($\lambda$n) is selected as the wavelength number n=1. At step S52, an input level (optical signal intensity) P($\lambda$n) dBm for the selected wavelength ($\lambda$n) is sampled. At step S53, nonuniformity of a photo diode 31a associated with the selected wavelength is corrected.

At step S54, the corrected optical signal intensity is compared with the upper bound threshold and the lower bound threshold to determine whether the corrected optical signal intensity ranges from the upper bound threshold to the lower bound threshold. If the corrected optical signal intensity is between the upper bound threshold and the lower bound threshold, the process control proceeds to step S65 to update the control order without modification of the VOA control value. On the other hand, if the corrected optical signal intensity is not between the upper bound threshold and the lower bound threshold, the process control proceeds to step S58 to modify the VOA control value.

At step S65, an order table is generated such that entries of the corrected optical signal intensity are listed in order closer to the upper bound threshold or the lower bound threshold, that is, in descending order of deviations from the center value. At step S56, the updated order table is stored in the order table memory 57, and then the process control proceeds to step S59.

On the other hand, at step S58, a VOA control value is computed to make the corrected optical signal intensity equal to the center value between the specified thresholds. Also, the wavelength number n associated with the computed VOA control value is listed as the first entry at the top of the order table, and the updated order table is stored in the order table memory 57.

At step S59, the VOA control value is read from the control memory 59 for each wavelength at a predefine cycle (through interrupt or others) and latched in the data latch unit 60 for VOA control.

Then, at step S60, the parameter n is incremented by one, and the process control returns to step S52 for iteration of the above-mentioned operations as long as the parameter n is smaller than or equal to the number N of used wavelengths at step S61.

In this embodiment, the previously corrected optical intensity detection values do not have to be maintained for reordering of the order table. Thus, the previous memory 54a is unnecessary, resulting in reduction of the required memory capacity.

[Exemplary VOA Control]

Figure 12:
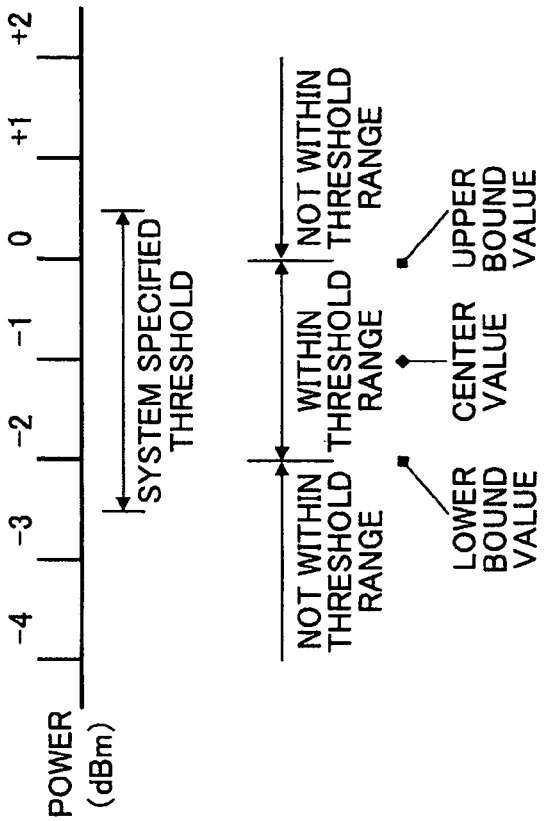
FIG. 12 illustrates an exemplary VOA control operation.

Exemplary VOA control is described in detail below. A system threshold is specified by an upper apparatus between −2.5 and +0.5 dBm. Assuming that the number N of used wavelengths is equal to four (N=4), as illustrated in FIG. 12, the specified threshold level computation unit 51 determines the lower bound threshold and the upper bound threshold to be equal to −2.0 dBm and 0.0 dBm, respectively, within the range from −2.5 to +0.5 dBm. The specified threshold level computation unit 51 computes the center value −1.0 dBm from the determined thresholds and stores these values in a threshold memory 52.

FIG. 13 illustrates some exemplary data items in VOA control, and FIG. 14 is an exemplary timing chart of the VOA control.

As illustrated in FIGS. 13 and 14, in initialization (FIG. 8), when levels of optical signal intensity corrected for wavelengths $\lambda$1, $\lambda$2, $\lambda$3 and $\lambda$4 reach +0.0, +0.5, −1.0 and −2.0 dBm, respectively, these levels of optical signal intensity are stored in the previous memory 54a. Then, VOA control values are computed to make the levels of the optical signal intensity associated with the different wavelengths equal to the center value −1.0 dBm and stored in the control memory 59 for VOA control. As a result, the levels of the optical signal intensity associated with the controlled wavelengths $\lambda$1, $\lambda$2, $\lambda$3 and $\lambda$4 have a uniform value −1.0 dBm.

Next, in the first VOA control (FIG. 9), when levels of the optical signal intensity corrected for wavelengths $\lambda$1, $\lambda$2, $\lambda$3 and $\lambda$4 reach −1.0, −1.2, −1.5 and −1.8 dBm, respectively, in order of the VOA control, these levels of optical signal intensity are stored in the previous memory 54a. Then, an order table is generated such that entries of the optical signal intensity are listed in order closer to the lower bound threshold −1.0 dBm or the upper bound threshold 0.0 dBm, that is, in order of $\lambda$4, $\lambda$3, $\lambda$2 and $\lambda$1.

Also, the VOA control is performed under a VOA control value stored in the control memory 59. As a result, the levels of the optical signal intensity associated with the controlled wavelengths $\lambda$1, $\lambda$2, $\lambda$3 and $\lambda$4 become equal to −1.0, −1.2, −1.5 and −1.8 dBm, respectively.

In the second VOA control (FIG. 10), when levels of the optical signal intensity corrected for wavelengths $\lambda$4, $\lambda$3, $\lambda$2 and $\lambda$1 reach −1.8, −1.0, −1.5 and −0.8 dBm, respectively, in order of the VOA control, these levels of optical signal intensity are stored in the previous memory 54a. Then, an order table is generated in descending order of variations between the currently corrected optical intensity detection values and the previously corrected optical intensity detection values, that is, in order of $\lambda$3, $\lambda$2, $\lambda$1 and $\lambda$4.

Also, the VOA control operation is performed under a VOA control value stored in the control memory 59. As a result, the levels of the optical signal intensity associated with the controlled wavelengths $\lambda$4, $\lambda$3, $\lambda$2 and $\lambda$1 will be equal to −1.8, −1.0, −1.5 and −0.8 dBm, respectively.

If the first embodiment in FIG. 10 is used in the second VOA control operation, the first embodiment will be also used in the third and subsequent VOA control operations. In FIG. 12, however, the second embodiment in FIG. 11 is used in the third VOA control operation.

In the third VOA control operation (FIG. 11), when levels of the optical signal intensity corrected for wavelengths $\lambda$3, $\lambda$2, $\lambda$1 and $\lambda$4 reach −2.1, −1.5, −1.0 and −1.3 dBm, respectively, in order of the VOA control, these levels of optical signal intensity are stored in the previous memory 54a, and the VOA control value associated with the wavelength $\lambda$3 is updated. Then, an order table is generated such that the wavelength $\lambda$3 associated with the updated VOA control value is listed at the top of the order table and that an entry of the associated optical signal intensity is listed in order closer to the lower bound threshold −1.0 dBm or the upper bound threshold 0.0 dBm, that is, in order of λ3, λ4, λ1 and λ2.

Also, the VOA control operation is performed under a VOA control value stored in the control memory 59. As a result, the levels of the optical signal intensity associated with the controlled wavelengths λ3, λ2, λ1 and λ4 will be equal to −1.0, −1.5, −1.0 and −1.3 dBm, respectively.

In this manner, it is possible to reduce the circuit size of the control unit 35 by performing time division multiplexing and VOA controlling the monitoring and adjustment units 30-1 through 30-N in the control unit 35. In addition, it is possible improve processing efficiency of the VOA control and enhance performance of the whole system through VOA control with the aid of order tables for prioritization.

In the above-mentioned embodiments, signal light components with different wavelengths are adjusted for the individual wavelengths to make respective signal light levels associated with the wavelengths uniform, and then the adjusted signal light components are multiplexed. In other embodiments, however, signal light components with different wavelengths are adjusted for the individual wavelengths to make respective signal light levels associated with the wavelengths uniform, and then a signal light component associated with any of the wavelengths may be selected.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An optical signal adjustment apparatus that makes optical signal intensity levels of input signal light components corresponding to different wavelengths uniform, the optical signal adjustment apparatus comprising:
    a plurality of monitoring and adjusting units, each unit including:
        an optical detector detecting an optical signal intensity level of a respective input signal light component corresponding to one of the different wavelengths, and
        a variable optical attenuator adjusting attenuation of the respective input signal light component corresponding to said one of the different wavelengths; and
    a controller configured to receive the optical signal intensity levels as detection signals from each of the optical detectors, successively select each one of the detection signals, generate control signals for the input signal light components corresponding to the different wavelengths based on the selected detection signals, and supply a control signal to each of the variable optical attenuators to make the optical signal intensity levels of the input signal light components corresponding to the different wavelengths uniform, and
    wherein the controller includes a memory that stores an order table indicative of a selection order to successively select each one of the detection signals.

2. The optical signal adjustment apparatus as claimed in claim 1, wherein the controller is configured to update the order table by modifying the selection order after supplying the control signal to the variable optical attenuators to make the optical signal intensity levels of the input signal light components corresponding to the different wavelengths uniform, the updated order table being stored in the memory.

3. The optical signal adjustment apparatus as claimed in claim 2, wherein the controller is configured to modify the selection order specified by the order table in descending order of a variation between a previous detection signal and a last detection signal.

4. The optical signal adjustment apparatus as claimed in claim 2, wherein the controller is configured to modify the selection order specified by the order table in descending order of a deviation between a detection signal value and a target control value.

5. An optical signal adjustment method carried out in an optical signal adjustment apparatus that makes optical signal intensity levels of input signal light components corresponding to different wavelengths uniform and includes a plurality of monitoring and adjusting units, each of the monitors units including an optical detector detecting an optical signal intensity level of a respective input signal light component corresponding to one of the different wavelengths, and a variable optical attenuator adjusting attenuation of the respective input signal light component corresponding to the said one of the different wavelengths, the optical signal adjustment method comprising:
    successively selecting each one of detection signals being received as the optical signal intensity levels from each of the optical detectors and corresponding to the different wavelengths;
    generating control signals corresponding to the different wavelengths based on the selected detection signals;
    supplying the generated control signal to each of the variable optical attenuators to make the optical signal intensity levels of the input signal light components corresponding to the different wavelengths uniform, and
    storing, in a memory included in the optical signal apparatus, an order table indicative of a selection order to successively select each one of the detection signals.

6. The optical signal adjustment method as claimed in claim 5, comprising:
    updating the order table by modifying the selection order after the supplying the control signal to each of the variable optical attenuators; and
    storing the updated order table in the memory.

7. The optical signal adjustment method as claimed in claim 6, wherein the selection order is modified in descending order of a variation between a previous detection signal and a last detection signal.

8. The optical signal adjustment method as claimed in claim 6, wherein the selection order is modified in descending order of a deviation between a detection signal value and a target control value.

9. A WDM transmission apparatus, comprising:
    an optical signal adjustment apparatus that makes optical signal intensity levels of input signal light components corresponding to different wavelengths uniform, the optical signal adjustment apparatus comprising:
    a plurality of monitoring and adjusting units, each of the units including:
        an optical detector to detecting an optical signal intensity level of a respective input signal light component corresponding to one of the different wavelengths, and a variable optical attenuator adjusting attenuation of the respective input signal light component corresponding to said one of the different wavelengths; and a controller configured to receive the optical signal intensity levels as detection signals from each of the optical detectors, successively select each one of the detection signals, generate control signals for the input signal light components corresponding to the different wavelengths based on the selected detection signals, and supply a control signal to each of the variable optical attenuators to make the optical signal intensity levels of the input signal light components corresponding to the different wavelengths uniform, and wherein the controller includes a memory that stores an order table indicative of a selection order to successively select each one of the detection signals.

\* \* \* \* \*

UNITED STATES PATENT AND TRADEMARK OFFICE
CERTIFICATE OF CORRECTION

PATENT NO. : 8,565,604 B2
APPLICATION NO. : 12/318320
DATED : October 22, 2013
INVENTOR(S) : Hideaki Koyano et al.

Page 1 of 1

It is certified that error appears in the above-identified patent and that said Letters Patent is hereby corrected as shown below:

On the Title Page, Item 56, In Column 2, (U.S. Patent Documents), Line 2, delete "2003/0099375 A1 5/2003 Sefcik".

In the Claims
In Column 10, Line 21, In Claim 5, after "the" delete "monitors".

Signed and Sealed this
First Day of April, 2014

Michelle K. Lee
*Deputy Director of the United States Patent and Trademark Office*